United States Patent [19]

Vacval

[11] 4,345,674
[45] Aug. 24, 1982

[54] DISC BRAKE PAD RETRACTOR

[75] Inventor: Dusan M. Vacval, Buffalo Grove, Ill.

[73] Assignee: International Harvester Co., Chicago, Ill.

[21] Appl. No.: 191,557

[22] Filed: Sep. 29, 1980

[51] Int. Cl.³ .................................................. F16D 65/38
[52] U.S. Cl. ................................. 188/71.8; 188/196 P
[58] Field of Search .............. 188/71.7, 71.8, 79.5 G, 188/79.5 M, 196 P, 72.3

[56] References Cited

U.S. PATENT DOCUMENTS

| | | | |
|---|---|---|---|
| 2,551,252 | 5/1951 | Du Bois | 188/71.8 |
| 2,830,680 | 4/1958 | Hawley | 188/196 P |
| 2,948,356 | 8/1960 | Butler | 188/196 P |
| 3,064,768 | 11/1962 | Dotto | 188/71.8 |
| 3,497,036 | 2/1970 | Seip | 188/71.8 |
| 3,613,849 | 10/1971 | Pape | 188/196 P |
| 3,618,714 | 11/1971 | Croswell | 188/71.8 |
| 4,050,548 | 9/1977 | Margetts | 188/71.8 |

FOREIGN PATENT DOCUMENTS 1227387  10/1961  France ......................... 188/196 P

*Primary Examiner*—Edward R. Kazenske
*Assistant Examiner*—Richard R. Diefendorf
*Attorney, Agent, or Firm*—D. K. Sullivan; F. D. Au Buchon

[57] ABSTRACT

A disc brake pad retractor includes a resistance member carried on a rod positioned between a pair of brake pads. The resistance member will be moved laterally as the pads wear. A spring loaded housing is associated with the resistance member and will serve to urge a brake pad away from the rotor when the disc brake is disengaged.

6 Claims, 4 Drawing Figures

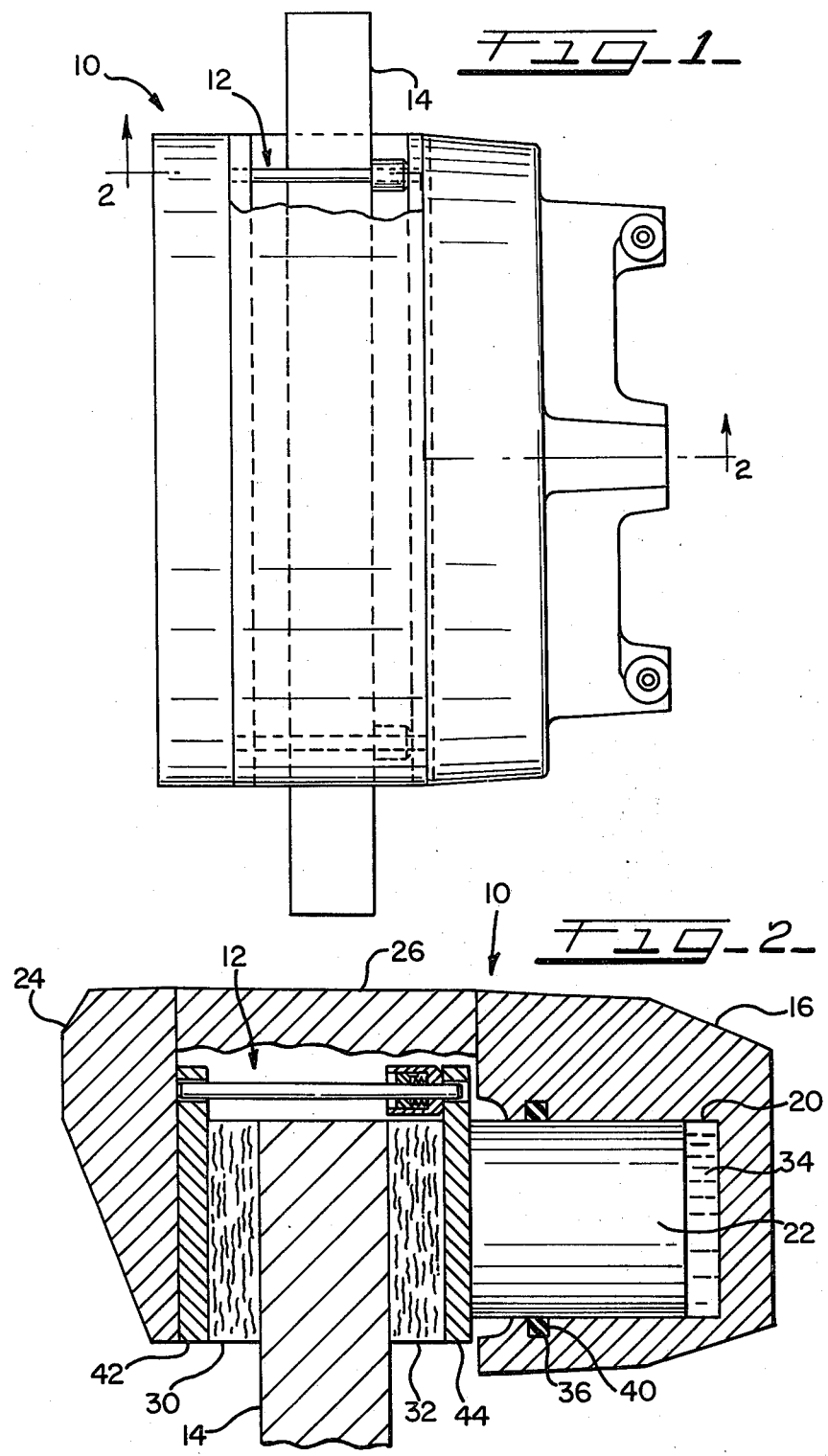

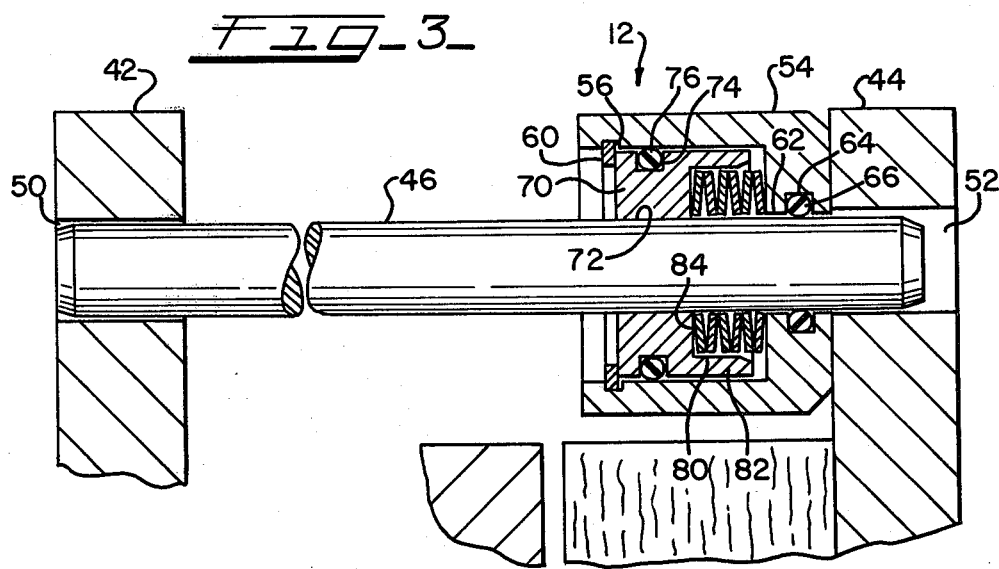
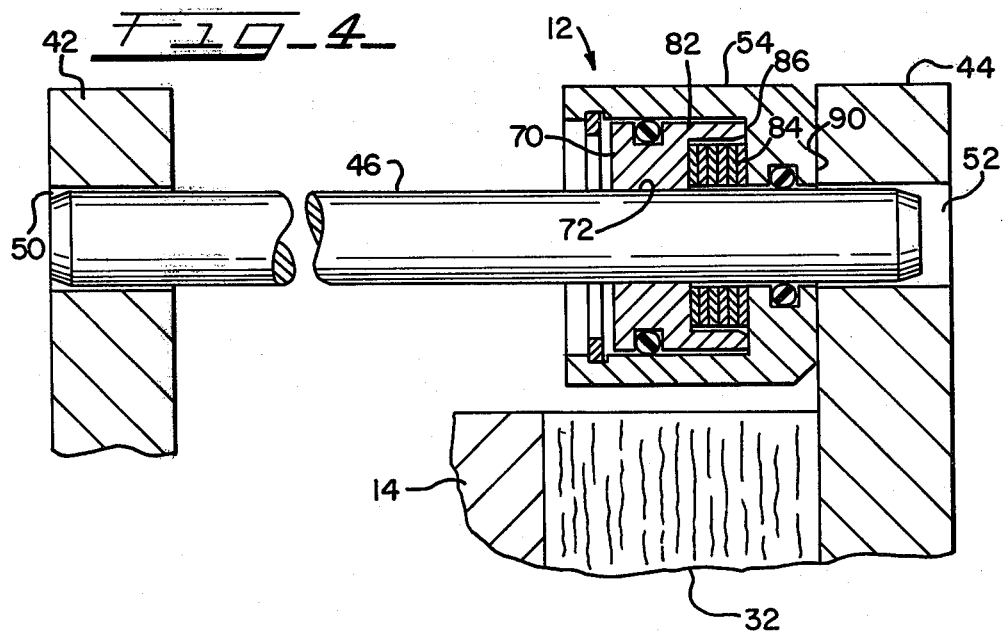

DISC BRAKE PAD RETRACTOR

BACKGROUND OF THE INVENTION

1. Field of the Invention

The invention concerns disc brake pad retractors. More specifically a disc brake pad retractor for urging a brake pad away from the brake rotor or disc when the brakes are not being applied is provided.

2. Description of the Prior Art

Disc brake systems are widely used in the automobile and truck industry for controlling the velocity of motor vehicles. The operation of the disc brake system is well known. When the brakes are applied a hydraulic cylinder is urged toward the rotating brake rotor. Friction pads are thus pushed against both sides of the rotor and the clamping force of the pads on the rotor will arrest the rotor motion and stop the vehicle.

When the brake pads are released after being applied, the brake piston will not automatically back away from the applied position unless it is spring loaded to back off. Conventional disc brakes are often subject to undesirable drag of the disengaged pads on the rotors. The drag causes power losses, a shortening of the service life of the pad and possible overheating of the brake components and wheel bearings. Drag is caused by brake pads being constantly urged against the disc at nominal pressure even after release of the application pressure. This could be caused by the oil seal of the brake piston preventing retraction of the piston to its original position as the piston was forced out under application pressure for a distance corresponding to an amount equal to caliper housing elastic deflection. New disc brake systems and specifically the brake rotors of such systems are often machined with a small amount of "run out" that is used to push the unenergized pad and piston assembly away from the brake rotor. This "run out" method is not always adequate to urge the pads away from the rotor as the "run out" of the rotor will quickly become negligable as the brake is used.

Another method of disc brake pad retraction depends on the seals of the brake piston to resiliently deform when the brake is applied. Upon release of the brake the seals will return to their original shape and retract the brake piston into the piston bore. The pads however, will remain in light contact with the rotor unless they are directly affixed to the pistons. Other mechanical retractors are known in the prior art as well. Return springs incorporated into the piston are known. The problem with this type of retractor is that unless the brake pads are fastened directly to the brake piston retracting mechanism the piston will only release pressure behind the pads but won't necessarily move the pads away from the rotor. Attaching the piston to the pads solves the problem, but makes pad replacement difficult and requires the use of specially manufactured brake pads resulting in increased cost and manufacturing difficulties.

Ratcheting type brake adjusters are also known but these are generally used to enable the stroke of the piston to be controlled so that the piston need not be moved through full stroke every time the brake is applied. This type of device is able to adjust only in incremental amounts equivalent to the degrees allowed by each ratchet tooth. The instant invention, however, is adjusted upon each brake application and also serves to urge at least one pad away from the disc.

The apparatus set forth in this invention seeks to provide a brake pad retractor that will urge a brake pad of a disc brake assembly away from the brake rotor after the brake has been released.

SUMMARY OF THE INVENTION

A disc brake pad retractor is disclosed for use in a disc brake system wherein a pair of disc brake pads are mounted for contact with braking surfaces of a rotor. Each brake pad is provided with a frictional material portion and a backing plate. The backing plate of each pad is drilled in two places to accommodate the disc brake pad retractor set forth herein.

The disc brake pad retractor is a spring loaded device carried on a solid rod which is accommodated in the holes drilled in brake pads positioned on each side of the brake rotor. The rod spans the transverse distance between brake pads when the brake pads are in a new condition. A spring loaded brake pad retractor assembly is carried on the rod and is urged longitudinally along the rod as the disc brake pads wear. When the brake is applied the retractor assembly will be urged slightly along the rod and when the brake is released the spring loaded portions of the retractor assembly will urge a brake pad away from the brake rotor.

It is among the objects of this invention to reduce or eliminate undesirable drag between the brake pads and rotor of a disc brake system by incorporating a mechanical retractor into presently known disc brake systems. Another object of this invention is to provide a brake pad retractor that can be fitted to current production brake assemblies with only a minimal modification of the replaceable brake pads and no modification to the brake caliper housing of a current disc brake assembly.

Also an object of this invention is to provide a brake pad retractor that works independently of brake piston retractors incorporated in some prior art devices.

Another object of this invention is to provide a brake pad retractor that will operate equally well with a floating or a fixed head brake caliper.

Another object of the invention is to provide a brake pad retractor that is inexpensive to manufacture and is impervious to normal environmental contaminents.

Another advantage of the instant invention is that if the brake pad retractor through age or wear becomes ineffectual its continued presence in the disc brake caliper housing will not adversely effect the performance of the brake. That is, if the resistance member can move freely on the retractor rod this movement will have no detrimental effect on brake performance.

BRIEF DESCRIPTION OF THE DRAWING FIGURES

These and other objects of the invention will be apparent from this specification when read in light of the following drawing figures wherein:

FIG. 1 presents a top view of a floating caliper disc brake with a portion broken away to expose a disc brake pad retractor;

FIG. 2 is a cross sectional view taken through plane 2—2 of FIG. 1;

FIG. 3 is an enlarged view of a disc brake pad retractor wherein the disc brake is in a disengaged mode; and FIG. 4 is an enlarged cross sectional view of a disc brake pad retractor wherein the disc brake is being applied.

DETAILED DESCRIPTION OF THE INVENTION

FIG. 1 is a top view of a floating caliper disc brake assembly generally 10 with a portion broken away to show a brake pad retractor assembly generally 12 as it would be installed in the disc brake assembly. The brake assembly 10 would be mounted in a conventional manner to a non-rotating member of a vehicle wheel support while the brake rotor 14 would be mounted to and rotate with a wheel of a host vehicle in a conventional manner.

FIG. 2, which is a cross sectional view through plane 2—2 of FIG. 1 shows, in cross section, components of one of the two brake pad retractor assemblies generally 12. The disc brake assembly generally 10 includes a brake piston housing 16 having a bore 20 in which a brake piston 22 is carried. The brake piston housing 16 is connected to a reaction member 24 by a transition piece 26. The brake piston housing 16, the transition piece 26 and the reaction member 24 make up the conventional non-rotating floating caliper disc brake. In the embodiment shown, the caliper is of a large type generally used on off-road hauling equipment and the brake piston 22 would be one of eight pistons housed in the brake piston housing 16. However, the invention would not be limited to multiple piston brake assemblies but would be equally adaptable and advantageous on single piston disc brakes as common on automobiles.

The disc brake housing supports a pair of brake pads, left 30 and right 32 which are movable in a plane transverse to the major plane of the rotor 14 so that upon fluid pressurization of chamber 34 the brake piston 22 can urge pad 32 into contact with the rotor 14. Since a floating caliper is shown the entire caliper generally 10 will be urged rightwardly in FIG. 2 whereby pad 30 is also urged against the rotor 14. The retractor assemblies generally 12 are located at the outside ends of the brake pads and not directly over the brake pistons.

Seal 36, retained in groove 40, is provided to minimize fluid passage from piston chamber 34 and is not designed to restrain the piston 22.

Brake pads 30 and 32 are bonded or otherwise fastened to lining carriers 42 and 44 which are metallic or composite plates that provide alignment and retention means to hold the pads in the caliper housing.

FIGS. 3 and 4 show the crux of the invention, that being the brake pad retractor assembly 12, in detail. FIG. 3 shows the retractor and brake in a disengaged mode while FIG. 4 shows the brake engaged.

The brake pad retractor assembly includes a retractor rod 46 which is fitted to apertures 50 and 52 in left and right lining carriers 42 and 44 respectively. Carried on the retractor rod 46 is a retractor housing 54. The housing is generally a cup shaped housing having an open end provided with a snap ring receiving groove 56 into which snap ring 60 is fitted. The second end of the retractor housing 54 is provided with a through bore 62 having a first "O-ring" receiving groove 64 into which "O-ring" 66 is fitted. The through bore 62 is a clearance fit on the retractor rod 46 so that the rod 46 can easily move through bore 62.

Carried inside the interior of the cup shaped retractor housing 54 is resistance member 70 having a bore 72 through the center thereof. The exterior surface of the resistance member is compatible with the interior of the retractor housing 54 and clearance is provided between the adjacent surfaces so that the resistance member 70 will not bind in the retractor housing 54. The resistance member may be provided with a circumferential "O-ring" groove 74 to accommodate a second "O-ring" 76.

An inboard end of the resistance member 70 is provided with a large cavity 80 defined by the circumferential wall 82 integral with the resistance member.

Carried in the large cavity 80 is a set of "belleville" washers 84 which have the retractor rod passing through the center of the washers. The "belleville" washers are stacked so that the adjacent "belleville" washers are face to obverse so that they tend to resist compression and act as a resilient means like a spring.

FIG. 4 shows the "belleville" washer set 84 in a compressed mode wherein there may be full face contact between each washer. The factor determining contact between adjacent washers will be the height of the washer stack when compressed relative to the depth of the large cavity 80 of the resistance member 70. The compressed stack has an overall length less than the depth of the large cavity. The circumferential wall 80 will contact the bottom of the cup-like interior of the retractor housing 54 at 86 as shown in FIG. 4.

Notice that in FIG. 4 the brake pad 32 is in contact with the rotor 14 and the right lining carrier 44 is in contact with the exterior base 90 of the retractor housing 54. Also the resistance member 70 is contacting the bottom of the cup like interior of the retractor housing 54 at contact point 86.

Important to the invention is that the fit of the resistance member 70 on the rod is an interference fit meaning that the resistance member is generally stationary on the rod 46 and can only be moved through the exertion of considerable pressure as could be generated by the application of the brake and the displacement of the brake piston 22. The resistance member could not be moved along the rod from expansion of the stack of belleville washers although these washers are strong enough to force the retractor housing laterally away from the resistance member 70 when the disc brake is not activated.

In operation the invention will work as follows: Assuming that at least one and more typically two brake pad retractor assemblies are positioned in aligned left 50 and right 52 apertures of the left 42 and right 44 lining carriers as the lining carriers are mounted in the caliper housing. At this point the pads 30 and 32 will be fresh and have significant thickness as shown in the FIG. 2 presentation. Notice that the brake pad retractor assembly is far to the right end of the retractor rod. Also note that the other end of the retractor rod rests against the surface of the reaction member 24 and is prevented from moving laterally as it is in the hole of the lining backing plate 42.

When brake pressure is applied by pressurizing fluid in the piston chamber 34 the brake piston 22 forces the brake pad 32 against the rotor 14 and simultaneously the right lining carrier 44 is pushed against the exterior base 90 of the retractor housing 54 thus causing deflection of the "belleville" washers 84 and compression of the stack until the resistance member 70 is contacted at point 86. After the release of the brake pressure the "belleville" washer 84 stack pushes the retractor housing 54 and lining carrier 44 away from the rotor 14 a predetermined desired amount equal to the gap between the inside of the snap ring 60 and the resistance member 70 measured when the retractor housing 54 is urged to contact the resistance member 70 at contact point 86.

The predetermined interference fit between the resistance member 70 and the retractor rod 46 will only provide slippage of the resistance member on the rod sufficient to take up lining wear. That is, as the pads wear the retractor housing 54 makes contact with the resistance member 70 under high force of the brake piston on brake application. The friction of the interference fit will be overcome and the resistance member 70 will be forced to slip on stationary retractor rod 46 an amount equal to the wear of the pads.

The predetermined interference fit between the retractor rod 46 and the resistance member will have enough friction to resist force that only deflects the "belleville" washer stack while allowing slip under higher loads to assure compensation for pad wear.

The preset gap between the resistance member 70 and the retractor housing 54 at point 86 (or to the inside of the snap ring 70 when "belleville" washers are fully compressed) is an established dimension based on caliper housing elastic deflection (caused by application of the vehicle brake) and maximum allowable return travel of the brake piston 22, which is limited by the volume displaced from piston chamber 34. A large displacement on return is to be avoided as the upstream master cylinder (or pressure converter) may have limited stroke.

Thus it is apparent that there has been provided in accordance with the invention a brake pad retractor mechanism that fully satisfies the objects, aims and advantages set forth above. While the invention has been described in conjunction with a specific embodiment thereof, it is evident that many alternatives, modifications and variations will be apparent to those skilled in the art in light of the foregoing description. For instance it is contemplated that the invention could be used with either floating or fixed head calipers. Furthermore it is contemplated that the invention could be used in disc brake systems wherein only one brake pad is utilized to contact the rotor. Accordingly, this disclosure is intended to embrace all such alternatives, modifications and variations as fall within the spirit and broad scope of the appended claims.

What is claimed is:

1. A disc brake system for braking a rotatable disc brake rotor comprising:

a selectively actuable caliper assembly disposed about said rotor;

a pair of lining carriers carried by said caliper assembly respectively on opposite sides of said rotor, each lining carrier having a brake pad in confronting relation to said rotor and having an axial aperture, said apertures being axially aligned; and a disc brake wear compensator and retractor assembly including a retractor rod carried in said apertures of said lining carriers, a cup shaped retractor housing slidably displaced on said retractor rod one of said lining carriers abutting said retractor housing and adapted to displace said retractor housing on said rod, a wear compensating resistance member disposed within said retractor housing and slidably mounted on said rod with an interference fit therebetween, said resistance member being slidably displaced by said retractor housing along said retractor rod when the displacement of said retractor housing on said retractor rod exceeds a predetermined distance, and spring means being disposed within said retractor housing between said retractor housing and said resistance member and being disposed to bias said retractor housing away from said resistance member said predetermined distance and said lining carrier and brake pad away from said rotor.

2. The invention in accordance with claim 1, said retractor rod carried in the aperture of said other of said lining carriers being disposed to abut said caliper assembly.

3. The invention in accordance with claim 1, wherein said spring means is a stack of belleville washers tending to urge said retractor housing away from said resistance member, said stack of belleville washers carried on said retractor rod and being accommodated within a recessed cavity formed in said resistance member.

4. The invention in accordance with claim 3, wherein said resistance member is provided with an O-ring receiving groove which accommodates an "O-ring" disposed between said resistance member and a cooperating inner cylindrical surface formed in said retractor housing, said cylindrical surface defining a housing cavity within said retractor housing and being coaxial with said retractor rod.

5. The invention in accordance with claim 4, wherein said retractor housing is provided with an "O-ring" receiving groove which accommodates an "O-ring" disposed between said retractor housing and said retractor rod.

6. The invention in accordance with claim 5, wherein said retractor housing is provided with a snap ring receiving groove for receiving a snap ring therein, said snap ring being provided to maintain said resistance member in said retractor housing.

* * * * *